United States Patent
Zaski et al.

(10) Patent No.: US 8,244,481 B2
(45) Date of Patent: Aug. 14, 2012

(54) METHODS FOR UTILIZING PAINT FORMULATIONS BASED ON PAINT COMPONENT RISK SCORES

(75) Inventors: Faye Ruth Zaski, Dexter, MI (US); Adam Nathan Deedler, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 371 days.

(21) Appl. No.: 12/634,159

(22) Filed: Dec. 9, 2009

(65) Prior Publication Data
US 2011/0137572 A1    Jun. 9, 2011

(51) Int. Cl.
*G01N 31/00* (2006.01)
*G06F 19/00* (2011.01)

(52) U.S. Cl. ........... 702/22; 427/8; 524/497; 700/32; 700/97; 702/32; 702/81

(58) Field of Classification Search ........... 702/22, 702/32, 107, 127, 182, 183, 81; 73/150 R; 427/8, 180; 700/32, 97, 107, 283; 703/22; 524/497
See application file for complete search history.

(56) References Cited

U.S. PATENT DOCUMENTS

| | | | |
|---|---|---|---|
| 6,330,487 B1* | 12/2001 | Jahn et al. | 700/97 |
| 6,816,756 B2 | 11/2004 | Shin et al. | |
| 7,045,169 B2 | 5/2006 | Freeman et al. | |
| 7,194,361 B2* | 3/2007 | Corrigan et al. | 702/32 |
| 7,250,464 B2* | 7/2007 | Friel et al. | 524/497 |
| 7,536,231 B2* | 5/2009 | McClanahan et al. | 700/32 |
| 2002/0148288 A1 | 10/2002 | Clark et al. | |
| 2002/0152049 A1 | 10/2002 | Lewis | |
| 2003/0124244 A1 | 7/2003 | Freeman et al. | |
| 2004/0122648 A1 | 6/2004 | Ando et al. | |
| 2004/0220773 A1 | 11/2004 | Nongaki et al. | |
| 2005/0043898 A1 | 2/2005 | Linsen et al. | |
| 2009/0157212 A1 | 6/2009 | McClanahan et al. | |
| 2009/0274827 A1* | 11/2009 | Anderson et al. | 427/8 |

* cited by examiner

*Primary Examiner* — John H Le
(74) *Attorney, Agent, or Firm* — Dinsmore & Shohl LLP (57) ABSTRACT

Methods for predicting the performance risk of a paint component are disclosed. The methods include providing a proposed paint formulation, wherein the proposed paint formulation comprises at least one paint component, and identifying previous paint formulations comprising the paint component. The methods further include evaluating formulation similarities between the previous paint formulations and the proposed paint formulation, assigning formulation similarity scores based on the formulation similarities, and determining a paint component risk score for the paint component based on the formulation similarity scores. The proposed paint formulation may be utilized in a manufacturing application when the paint component risk score satisfies a manufacturing threshold value.

20 Claims, 3 Drawing Sheets

METHODS FOR UTILIZING PAINT FORMULATIONS BASED ON PAINT COMPONENT RISK SCORES

TECHNICAL FIELD

The present specification generally relates to methods for adjusting paint formulations and, more specifically, to methods for adjusting paint formulations based on a risk assessment of the paint formulation.

BACKGROUND

Paints can exhibit numerous visual and physical characteristics such as color, gloss, weatherability, durability and other traits that may influence their potential life and suitability for particular applications. To control and adjust the visual and physical characteristics based on the intended or desired application of the paint, the formulation of the paint may be adjusted. Specifically, paint formulations can comprise a variety of elements that can individually influence one or more of its physical and/or visual characteristics. For example, base formulations comprising various resins, solvents and/or additives may be mixed with paint components such as pigments and/or metallic flakes to obtain a paint formulation with a desired color. However, while the performance of the base formulations may be determined based on previous uses, the addition of various pigments, metallic flakes and other paint components may introduce additional risk due to unknown performance. Further, the testing and evaluations of new paint formulations can become a time and cost intensive process.

Accordingly, a need exists for alternative methods for predicting risks in utilizing paint components in proposed paint formulations.

SUMMARY

In one embodiment, a method for predicting the performance risk of paint components is provided. The method includes providing a proposed paint formulation, wherein the proposed paint formulation comprises at least one paint component, identifying a previous paint formulation having the paint component, evaluating formulation similarities between the previous paint formulation and the proposed paint formulation, assigning a formulation similarity score based on the formulation similarities, determining a paint component risk score for the paint component based on the formulation similarity score, and utilizing the proposed paint formulation in a manufacturing application when the paint component risk score satisfies a manufacturing threshold value.

In another embodiment a method for adjusting a paint formulation is provided. The method includes providing a proposed paint formulation, the proposed paint formulation comprising at least one paint component, identifying previous paint formulations comprising the paint component, evaluating paint similarities between the previous paint formulations and the proposed paint formulations, assigning paint similarity scores based on the paint similarities, evaluating compositional similarities between the amount of the paint component in the proposed paint formulation and the amount of the paint component in the previous paint formulations, assigning compositional similarity scores based on the compositional similarities, determining a paint component risk score for the paint component based on the paint similarity scores and the compositional similarity scores, and, adjusting the paint component in the proposed paint formulation when the paint component risk score does not satisfy a manufacturing threshold value.

In yet another embodiment, a method for selecting a proposed paint formulation is provided. The method includes providing a plurality of proposed paint formulations and determining paint component risk scores for each of the plurality of proposed paint formulations. Paint component risk scores are determined by identifying previous paint formulations comprising a paint component of the proposed paint formulation, evaluating paint similarities between the previous paint formulations and the proposed paint formulation, assigning paint similarity scores for each of the proposed paint formulations based on the paint similarities, evaluating compositional similarities between the amount of the paint component in the proposed paint formulation and the amount of the paint component in the previous paint formulations, assigning paint compositional similarity scores based on the compositional similarities between the proposed paint formulation and the previous paint formulations, and determining the paint component risk score for the paint component based on the paint similarity scores and compositional similarity scores. A favored proposed paint formulation is then used in manufacturing, wherein the favored proposed paint formulation is selected from the plurality of proposed paint formulations based on its paint component risk score.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
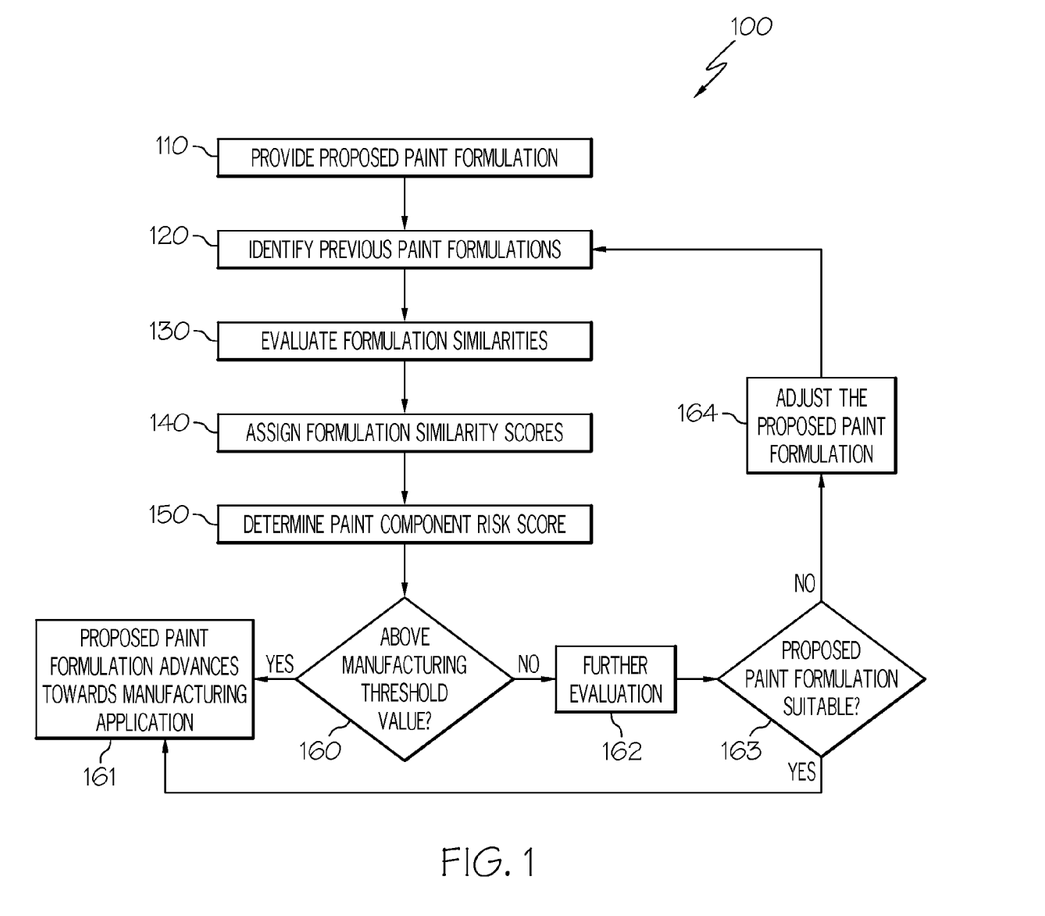
FIG. 1 depicts a method for evaluating risk in using one or more paint components in a proposed paint formulation according to one or more embodiments shown and described herein.

FIG. 1 generally depicts a flow chart of a method for assessing the risk of using a particular paint component in a proposed paint formulation. One or more paint components in a proposed paint formulation may be analyzed to determine whether its performance can adequately be predicted based on prior use and experience. A proposed paint formulation is compared with other previously used paint formulations which include the same paint component. Risk is assessed by awarding points based on the number of prior uses of the paint component in previous paint formulations as well as the similarities between the previous paint formulations and the proposed paint formulation. The method can be repeated for additional paint components in the proposed paint formulation such that all paint components in the proposed paint formulation are evaluated. By comparing and weighing previous uses of the paint components in the proposed paint formulation, the performance risk in using the paint components may be assessed to determine the necessary adjustments to the proposed paint formulation, or if the proposed paint formulation may be utilized in manufacturing.

Figure 2:
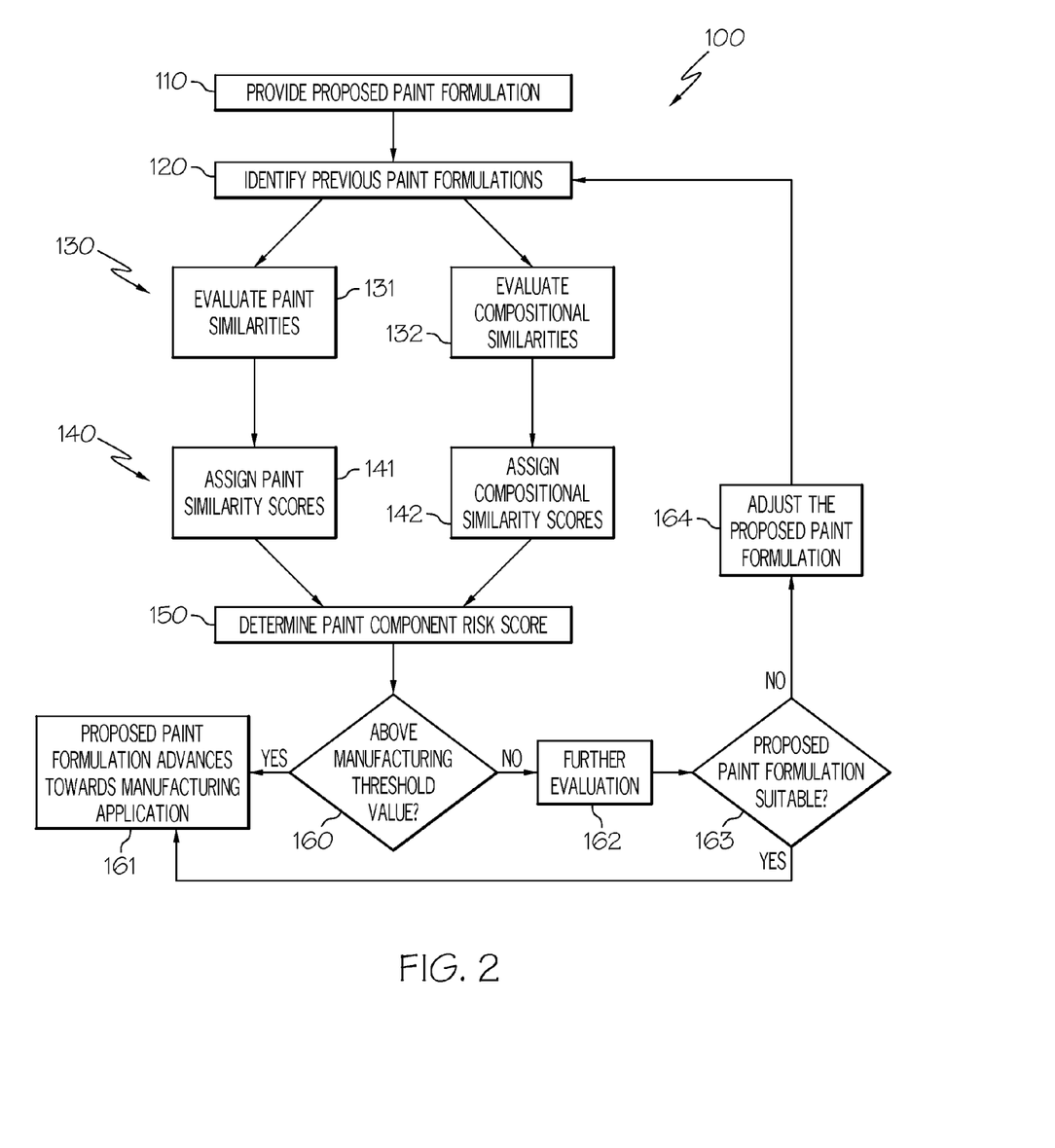
FIG. 2 depicts a method for evaluating risk in using one or more paint components in a proposed paint formulation based on its paint similarities and compositional similarities with previous paint formulations according to one or more embodiments shown and described herein.

Referring now to FIGS. 1 and 2, flow charts of a risk assessment method 100 for predicting the performance risk of paint components are depicted. The phrase "paint formulations" refers to the plurality of individual elements that make-up a paint. Paint formulations include paint components and base elements which dictate the physical, chemical and visual aspects of the paint. For example, paint components include pigments that impart color to the paint formulation, metallic flakes that give the paint formulation a metallic appearance, or any other component which influences the visual characteristics of the proposed paint formulation. Base elements include resins, solvents, additives or any other element that may influence the performance (such as the weatherability) of the paint. For example, base elements can influence the life of the paint, the stability of the paint, the manufacturability of the paint, the cost of the paint and/or other properties that influence the suitability of the paint for a particular application.

The risk assessment method 100 may begin by providing a proposed paint formulation in step 110. In one embodiment, to arrive at the proposed paint formulation, a target color may be selected for use on an article of manufacture (such as a vehicle). The target color may be defined as a specific color or a color range allowing for slight variations of the specific color. Once the target color is determined, one or more paint formulations may be proposed that would satisfy the target color. As discussed above, the proposed paint formulation may comprise a plurality of paint components (e.g., pigments and/or metallic flakes) as well as various base elements (e.g., resins, solvents and/or other additives). In another embodiment, a paint formulation may be proposed in step 110 by adding paint components to a base formulation previously used in one or more previous paint formulations. A base formulation may comprise predetermined amounts, ranges and/or types of base elements (such as resins, solvents and/or other additives) wherein paint components may be added to adjust the visual characteristics of the previously used base formulation. In another embodiment, a plurality of predetermined base formulations may exist such that paint components may be added to any one of the predetermined base formulations to produce a paint that satisfies the target color thereby providing the proposed paint formulation. The availability and/or amount of base formulations for potential use in the proposed paint formulation may depend in part on manufacturing capabilities (such as whether a plant is set-up for a particular type of paint) and/or economic factors (such as the cost of one base formulation relative to other base formulations).

Once a proposed paint formulation is provided in step 110, previous paint formulations are identified in step 120. Identifying previous paint formulations in step 120 means identifying a paint component (e.g., a specific pigment or metallic flake) present in the proposed paint formulation and identifying previously used paint formulations that include the same paint component. For example, the proposed paint formulation may comprise a specific black pigment. In this example, identifying previous paint formulations in step 120 would comprise identifying previously used paint formulations which included the same black pigment. In one embodiment, as many potential previous paint formulations as possible are identified such that the previous paint formulations are as numerous as possible. In another embodiment, as many potential previous paint formulations as possible are identified, but only a specific number of the previous paint formulations are selected for further use in the risk assessment method 100. In yet another embodiment, a maximum number of previous paint formulations to identify is set (for example, three, five or ten) such that only a limited number of previous paint formulations are identified.

In one embodiment, the previous paint formulations are identified via an electronic paint formulation database. In such an embodiment, the electronic paint formulation database may comprise a plurality of previous paint formulations including the types and amounts of paint elements (i.e., the paint components and base elements) that make up each of the previous paint formulations. Thus, the electronic paint formulation database may be searched using any one of the paint components used in the proposed paint formulation to identify any or all previous paint formulations that contain that same paint component.

After the previous paint formulations have been identified in step 120 based on a paint component in the proposed paint formulation (provided in step 110), formulation similarities are evaluated in step 130 between the proposed paint formulation and each of the previous paint formulations. The evaluation of formulation similarities will result in the assignment of formulation similarity scores to the paint component in step 140. A formulation similarity score can be assigned for every comparison between the proposed paint formulation and each of the previous paint formulations as will be explained further herein. Specifically, in step 130, each of the previously used paint formulations are compared to the proposed paint formulation to identify formulation similarities. Formulation similarities can comprise paint similarities, compositional similarities, or any other identifiable similarities (such as any type of chemical or physical similarities) between the proposed paint formulation and each of the previous paint formulations. As used herein, the phrase "paint similarity" refers to the similarity between base elements in each of the previous paint formulations and the proposed paint formulation or the overall type of base formulation (such as solvent-based or water-based). Also as used herein, the phrase "compositional similarity" refers to the similarity between the amount of the identified paint component in each of the previous paint formulations and the amount of the identified paint component used in the proposed paint formulation.

Referring specifically to the risk assessment method illustrated in FIG. 2, in one embodiment, evaluating formulation similarities in step 130 comprises evaluating paint similarities in step 131. In this embodiment the proposed paint formulation is independently compared to each of the previous paint formulations determined in step 120. Specifically, base elements in the proposed paint formulation are compared to the base elements in each of the previous paint formulations. The comparison between base elements in the proposed paint formulation and the previous paint formulation can comprise comparisons of the types of base elements present, the amount of each base element present, the overall formulation of the base elements, the overall type of base formulation (such as solvent-based or water-based), the origin of the base elements (such as the company or location of manufacture of the base elements or the location of manufacture of the overall base formulation) or any other comparison between base elements. The comparison of base elements may be used to assess the risk in using a specific paint component in the proposed paint formulation. For example, where a specific paint component is present in both the proposed paint formulation and a previous paint formulation, and the same base elements are used in the proposed paint formulation and the previous paint formulation (i.e., the proposed paint formulation and previous paint formulation comprise the same base formulation), the risk of using the specific paint component in the proposed paint formulation may be less than where the base elements are dissimilar (i.e., the proposed paint formulation and previous paint formulation comprise different base formulations). Accordingly, the more similar the previous paint formulation is to the proposed paint formulation, the more predictable the performance of the specific paint component may be.

After the paint similarities between the proposed paint formulation and one of the previous paint formulations are evaluated in step 131, a paint similarity score is assigned in step 141. The assigned paint similarity score is based on and reflects the paint similarity (that is, the similarity in base elements) between the proposed paint formulation and one of the previous paint formulations. Specifically, similarity scores may be assigned relative to a scale such that a proposed paint formulation with greater similarity to a previous paint formulation results in the assignment of a score toward one end of the scale, while a proposed paint formulation with little similarity to a previous paint formulation results in the assignment of a score toward the other end of the scale. Any scale or scoring system may be utilized such that paint similarity scores awarded for more similar formulations are weighted differently than paint similarity scores awarded for less similar formulations when used to determine the paint component risk score as will be described further herein.

In one embodiment, high paint similarity scores are awarded for the greatest similarities. For example, where the base elements used in the previous paint formulation are the same (i.e., having the same base formulation) as those in the proposed paint formulation, and where the previous paint formulation was produced by the same manufacturer that will produce the proposed paint formulation, a high paint similarity score (e.g., such as three on a scale of zero to three) is assigned to the paint component in step 141. Where the base elements used in the previous paint formulation are different than the base elements in the proposed paint formulation, but the previous paint formulation was produced by the same manufacturer that produced the proposed paint formulation, an intermediate paint similarity score (e.g., such as two on a scale of zero to three), is assigned to the paint component in step 141. Where the base elements used in the previous paint formulation are the same as those used in the proposed paint formulation but the previous paint formulation was produced by a manufacturer other than the manufacturer that produces the proposed paint formulation, a low paint similarity score (e.g., such as one on a scale of zero to three) is assigned to the paint component in step 141. Alternatively, where the previous paint formulation was produced by a manufacturer other than the manufacturer that produces the proposed paint formulation and only the type of base formulation is known for the previous paint formulation (such as if it is a solvent-based or water-based paint), a low paint similarity score (e.g., such as one on a scale of zero to three) may also be assigned to the paint component in step 141 if the type of base formulation is the same as with the proposed paint formulation. And, where the base elements used in the previous paint formulation are different than the base elements in the proposed paint formulation, and the previous paint formulation was produced by a manufacturer other than the manufacturer that produced the proposed paint formulation, a lowest or no paint similarity score (e.g., such as zero on a scale of zero to three) is assigned to the paint component in step 141. It should be understood that the specific ranking of paint similarities, and the scores associated therewith, may comprise any other suitable hierarchy or scoring system where more similar relationships are accorded a different weight than less similar relationships.

The evaluation of paint similarities (step 131) and the assignment of paint similarity scores (step 141) can include an evaluation between the proposed paint formulation and each of the previous paint formulations. Thus a paint similarity score can be assigned in step 141 to the paint component for each evaluation between the proposed paint formulation and each of the previous paint formulations containing the paint component. As a result, multiple paint similarity scores can be combined in forming the paint component risk score in step 150 as will be described further herein.

Still referring to the risk assessment method illustrated in FIG. 2, evaluating formulation similarities in step 130 can additionally or alternatively comprise evaluating compositional similarities in step 132. In this embodiment the proposed paint formulation is independently compared to each of the previous paint formulations determined in step 120. Specifically, the amount of the specific paint component (i.e., the paint component used to identify previous paint formulations) in each of the previous paint formulations is compared to the amount of the paint component in the proposed paint formulation. The comparisons of the amount of paint component may be used to predict the risk of using the paint component in the proposed paint formulation. For example, where a specific paint component is present in both the proposed paint formulation and a previous paint formulation in similar amounts, the risk of using the paint component in the proposed paint formulation may be lower since the performance is more predictable based on the similar prior use of the paint component.

In this embodiment, compositional similarity scores are assigned to the proposed paint formulation after the compositional similarities are evaluated. In one embodiment, the compositional similarity scores are based on whether the amount of paint component used in the previous paint formulation is greater than or equal to the amount of the paint component used in the proposed paint formulation (such as, for example, by comparing weight percentages of the paint component in the total proposed paint formulation). If the amount of the paint component in the previous paint formulation is greater than or equal to the amount in the proposed paint formulation, the paint component may be assigned a high compositional similarity score (e.g., such as one on a scale of zero to one) in step 142. If the amount of the paint component in the previous paint formulation is lower than the amount in the proposed paint formulation, the paint component may be assigned a low or no compositional similarity score (e.g., such as zero on a scale of zero to one).

In another embodiment, the compositional similarity score may be assigned based on whether the amount of paint component used in the previous paint formulation falls within a certain range of the amount of paint component used in the proposed paint formulation. For example, if the amount of paint component used in the previous paint formulation is within ±5% of the amount in the proposed paint formulation, the paint component may be assigned a high compositional similarity score (e.g., such as two on a scale of zero to two). If the amount of the paint component used in the previous paint formulation is outside of ±5% of the amount in the proposed paint formulation, but within ±10% of the amount in the proposed paint formulation, the paint component may be assigned an intermediate compositional similarity score (e.g., such as one on a scale of zero to two). And, if the amount of the paint component used in the previous paint formulation falls outside of all specified ranges of the amount in the proposed paint formulation, the paint component may be assigned a low or no compositional similarity score (e.g., such as zero to two). It should be understood that the specific ranking of compositional similarities and scores associated with those rankings may comprise any other suitable hierarchy or scoring system where more similar relationships are accorded a different weight than less similar relationships.

In yet another embodiment, the compositional similarity score assigned based on the comparison of the proposed paint formulation with a previous paint formulation may depend in part on the paint similarities between the two. For example, a high compositional score (e.g., such as two on a scale of zero to two) may be assigned only if the amount of paint component used in the previous paint formulation is greater than or equal to the amount of the paint component used in the proposed paint formulation and the base elements used in the previous paint formulation are the same as those used in the proposed paint formulation. However, an intermediate compositional similarity score (e.g., such as one on a scale of zero to two) may be assigned if the amount of paint component used in the previous paint formulation is higher than or equal to the amount of the paint component in the proposed paint formulation, but the base elements used in the previous paint formulation are different than the base elements used in the proposed paint formulation.

Similar to the evaluation of paint similarities (step 131) and the assignment of paint similarity scores (step 141), the evaluation of compositional similarities (step 132) and assignment of compositional similarity scores (step 142) can include a comparison of the proposed paint formulation with each of the previous paint formulations. Thus, a compositional similarity score is assigned in step 142 for each of the compositional similarity evaluations with each of the previous paint formulations. The multiple compositional similarity scores can be combined to assign a value to the paint component risk score in step 150 as will be described in further detail herein.

Thus, steps 130 and 140 can be repeated such that each identified previous paint formulation is compared to the proposed paint formulation. For example, once the formulation similarities are evaluated in step 130 between a specific previous paint formulation and the proposed paint formulation, and a formulation similarity score is assigned in step 140, the process may be repeated for a different previous paint formulation. Accordingly, it should be understood that steps 130 and 140 may be repeated until the proposed paint formulation is compared to each of the previous paint formulation identified in step 120. However, it should also be understood that any other order of evaluating formulation similarities in step 130 and assigning formulation similarity scores in step 140 may occur. For example, in one embodiment, all of the previous paint formulations may be evaluated in step 130 before formulation similarity scores are assigned in step 140. Furthermore, where evaluation of the formulation similarities in step 130 comprises a plurality of types of evaluations (such as evaluating paint similarities in step 131 and evaluating compositional similarities in step 132), each individual evaluation may occur in any sequence with respect to other evaluations as well as with respect to the assignment of similarity scores. Thus, the evaluation of any formulation similarities (such as paint similarities and compositional similarities), and assignment of similarity scores based thereon, can occur simultaneously or in any sequential, alternating, random or other order.

Referring to the risk assessment method 100 illustrated in FIGS. 1 and 2, once formulation similarity scores have been assigned to the paint component in step 140, a paint component risk score is determined in step 150 based on the formulation similarity scores. Determining the paint component risk score in step 150 comprises utilizing the formulation similarity scores to determine a score (the paint component risk score) that represents the overall risk in using a given paint component in the proposed paint formulation. Paint components that have been used more frequently in the past and/or in more similar applications can have greater paint component risk scores. That is, having more previous paint formulations for comparison will allow for more potential assignments of formulation similarity scores thereby potentially increasing the final paint component risk score. For example, in one embodiment, all of the formulation similarity scores assigned in step 140 may be added to form the paint component risk score. A paint component that was used five previous times will have more scores assigned to it than a paint component that was only used two previous times. Where higher formulation similarity scores were awarded for greater similarities between the proposed paint formulation and the previous paint formulations, a higher paint component risk score will represent a more predictable use of the paint component in the proposed paint formulation. It should be appreciated that any other method or combination of the formulation similarity scores may be utilized to determine the paint component risk score such that the paint component risk score represents the overall risk in using a given paint component in the proposed paint formulation.

The paint component risk score determined in step 150 may be used to determine whether the paint component should be used in the proposed paint formulation such that it advances towards a manufacturing application, or whether further evaluation should take place to examine the performance of the paint component in the proposed paint formulation. For example, a manufacturing threshold value may be set for comparison with the paint component risk score. The manufacturing threshold value can comprise any value in which the level of risk in utilizing the proposed paint formulation for manufacturing is low. For example, as illustrated in FIGS. 1 and 2, the paint component risk score may be compared with the manufacturing threshold value in step 160. If the paint component risk score is greater than or equal to the manufacturing threshold value, the paint component can advance towards a manufacturing application in step 161. Advancing towards s manufacturing application comprises approving the proposed paint component such that the proposed paint formulation either undergoes any remaining routine testing performed on all paints prior to use in manufacturing, or is directly utilized in a manufacturing application such as being applied to a car.

In one embodiment, a paint component risk score that satisfies the manufacturing threshold value in step 160 may result in the proposed paint formulation being directly utilized in production of a car. However, if the paint component risk score does not satisfy the manufacturing threshold value in step 160, then the proposed paint formulation may undergo further evaluation in step 162. Further evaluation may comprise any further analysis and/or testing to the proposed paint formulation that assists in addressing the concern of utilizing the paint component in the proposed paint formulation. For example, further evaluation may comprise performing additional tests such as weatherability tests (in which the paint is exposed to extreme weather conditions), sprayability tests (in which the paint is tested for compatibility with production spray equipment) or any other test to evaluate the performance of the proposed paint formulation. The suitability of the proposed paint formulation may then be determined in step 163. If the proposed paint formulation is deemed suitable (e.g., it passed its weatherability tests), then the proposed paint formulation may advance towards its manufacturing application in step 161 such that any remaining final tests can occur and/or it can be utilized in a manufacturing application. However, if the proposed paint formulation is not deemed suitable, then the proposed paint formulation may be adjusted in step 164 to form an adjusted proposed paint formulation. An adjusted proposed paint formulation is any variant of the proposed paint formulation in which one or more of the paint components have been adjusted but in which the types and amounts of base elements remain unchanged. Adjusting a paint component includes changing the type of component or the amount of the component used. For example, where only one of the paint components in a proposed paint formulation possesses a paint component risk score that does not satisfy the manufacturing threshold value, that specific paint component may be adjusted. Specifically, while the base elements remain unchanged, the amount of that paint component may be lowered relative the other paint components and/or replaced by or supplemented with a new paint component.

Any other adjustment to the paint components may alternatively occur such that the base elements in the proposed paint formulation remains unchanged. After the proposed paint formulation is adjusted in step 164, the method can repeat starting with step 120. In another embodiment, if the paint component risk score does not satisfy the manufacturing threshold in step 160, the proposed paint formulation may be adjusted in step 164 without undergoing further evaluation. In such an embodiment, the proposed paint formulation may be adjusted without the potential cost and labor associated with further evaluation.

The risk assessment method 100 may be used for a single paint component or for a plurality of paint components. For example, the risk assessment method 100 may be repeated for additional paint components such that the risk is evaluated for multiple or all paint components in the proposed paint formulation. In such an embodiment, the paint component scores for each of the paint components may independently or in combination result in either the advancement of the proposed paint formulation towards utilization in manufacturing or undergo further evaluation of the proposed paint formulation to examine the risk in using one or more paint components. For example, in one embodiment, the proposed paint formulation may undergo further evaluation if any one of the paint component scores fails to satisfy the manufacturing threshold. In another embodiment, the proposed paint formulation may undergo further evaluation if a certain percentage of paint component risk scores fail to satisfy the manufacturing threshold. In yet another embodiment, the proposed paint formulation may undergo further evaluation if an average paint component risk score (i.e., the sum of all paint component risk scores divided by the number of paint components for which paint component risk scores were obtained) fails to satisfy the manufacturing threshold. It should be appreciated that the paint component risk scores may be used in any other variation, individually or in combination, to determine whether the proposed paint formulation is utilized in manufacturing or undergoes further evaluation and/or adjustment.

It should be appreciated that the risk assessment method described herein may be performed on a computer wherein the computer comprises the electronic paint formulation database and/or is in communication with one or more electronic paint formulation databases. For example, an operator may enter the proposed paint formulation (i.e., the base elements and paint components) into the computer. The computer may then iteratively compute a paint component risk score for each paint component by identifying previous paint formulations in the electronic paint formulation database(s) that contain one or more of the paint components of the proposed paint formulation. The computer can then evaluate formulation similarities between each of the previous paint formulations and the proposed paint formulation such that formulation similarity scores are assigned and the paint component risk score is determined for each paint component in the proposed paint formulation. Accordingly, it should be understood that the risk assessment method described herein may comprise a sequence of computer executable instructions stored on a computer readable medium. The computer readable medium can comprise any device for storing electronic information such as, for example, a hard drive, a flash drive, a CD, a DVD, a server or any other suitable storage device technology. The instructions can include identifying a previous paint formulation having a paint component contained in a proposed paint formulation. The instructions can further include evaluating formulation similarities between the previous paint formulation and the proposed paint formulation, assigning a formulation similarity score based on the formulation similarities, and outputting a paint component risk score for the paint component based on the formulation similarity score.

The risk assessment method 100 presented in FIGS. 1 and 2 may be further understood through the following exemplary risk evaluation comparing a hypothetical proposed paint formulation with three hypothetical previous paint formulations. It is noted that the types and amounts of paint elements (i.e., the paint components and base elements) contained in each of the paint formulations are generically represented for the purpose of demonstrating the risk assessment method 100.

For the demonstration of the risk assessment method 100, the paint component risk scores for each hypothetical paint component in the proposed formulation is determined by adding the paint similarity scores and the compositional similarity scores. Paint similarity scores are assessed by assigning three points if the base elements used in the previous paint formulation are the same as to those used in the proposed paint formulation and if the previous paint formulation is produced by the same manufacturer that produces the proposed paint formulation. Two points are assigned if the base elements used in the previous paint formulation are different than the base elements used in the proposed paint formulation, but the previous paint formulation is produced by the same manufacturer that produces the proposed paint formulation. One point is assigned if the overall type of base formulation (e.g., water-based or solvent-based) used in the previous paint formulation is the same as those used in the proposed paint formulation but the previous paint formulation is produced by a manufacturer other than the manufacturer that produces the proposed paint formulation. Finally, no points are assigned if the base elements in the previous paint formulation are different than the base elements used in the proposed paint formulation, and the previous paint formulation is produced by a manufacturer other than the manufacturer that produces the proposed paint formulation.

Compositional similarity scores are assessed by assigning two points if the amount of the paint component in the previous paint formulation is greater than or equal to the amount in the proposed paint formulation and if the base elements used in the previous paint formulation are the same as to those used in the proposed paint formulation. One point is assigned if the amount of the paint component in the previous paint formulation is greater than or equal to the amount in the proposed paint formulation but the base elements in the previous paint formulation are different than the base elements used in the proposed paint formulation. No points are assigned if the amount of the paint component in the previous paint formulation is less than the amount in the proposed paint formulation. The manufacturing threshold value is set at five.

The hypothetical proposed paint formulation, as provided in accordance with step 110 in FIGS. 1 and 2, is presented in Table 1 below. The proposed paint formulation is solvent based and has a base formulation of 60 PHR (parts per 100 resin) Acrylic A, 40 PHR Polyester A and 10 PHR UV Absorber A. The proposed paint formulation further comprises 20 PWC (pigment weight content) of White 1, 15 PWC of Red 1 and 10 PWC of Blue 1 as its pigments (i.e., paint components).

TABLE 1

Hypothetical Proposed Paint Formulation
Proposed Paint Formulation

| | Manufacturer A | Amounts |
|---|---|---|
| Paint | White 1 | 20 PWC |
| Components | Red 1 | 15 PWC |
| | Blue 1 | 10 PWC |
| Base | Acrylic A | 60 PHR |
| Elements | Polyester A | 40 PHR |
| (Solvent) | UV Absorber A | 10 PHR |

In accordance with step 120 of FIGS. 1 and 2, three previous paint formulations are identified that contain one or more of the paint components contained in the proposed paint formulation. The three hypothetical paint formulations are presented in Table 2.

TABLE 2

Hypothetical Previous Paint Formulations

| Previous Paint Formulation X | | | Previous Paint Formulation Y | | | Previous Paint Formulation Z | | |
|---|---|---|---|---|---|---|---|---|
| | Manufacturer A | Amounts | | Manufacturer A | Amounts | | Manufacturer B | Amounts |
| Paint Components | White 1 Red 2 Blue 1 | 20 PWC 15 PWC 5 PWC | Paint Components | Black 1 Red 1 Blue 1 | 25 PWC 20 PWC 5 PWC | Paint Components | White 1 Red 1 Yellow 1 | 20 PWC 25 PWC 3 PWC |
| Base Elements (Solvent) | Acrylic A Polyester A UV Absorber A | 60 PHR 40 PHR 10 PHR | Base Elements (Water) | Acrylic B Polyester A UV Absorber B | 70 PHR 30 PHR 10 PHR | Base Elements (Solvent) | Acrylic C Polyester C UV Absorber C | 60 PHR 40 PHR 10 PHR |

In accordance with steps 130 and 140 of FIG. 1 (and specifically steps 131, 132, 141 and 142 of FIG. 2), the formulation similarities (i.e., the paint similarities and the compositional similarities) are evaluated and the formulation similarity scores (i.e., the paint similarity scores and the compositional similarity scores) are assigned for each paint component of the proposed paint formulation by comparing the proposed paint formulation with previous paint formulations containing the same paint component. The formulation similarity scores are then combined to determine the paint component risk score in accordance with step 150 of FIGS. 1 and 2. Steps 130 through 150 are repeated for each paint component such that a paint component risk score is determined for each paint component in the proposed paint formulation, the results of which are presented in Table 3.

TABLE 3

Determination of Paint Component Risk Score for Each Paint Component
(PSS = Paint Similarity Score; CSS = Compositional Similarity Score)

| | Same Base Formula; Same Manufacturer | | | Different Base Formula; Same Manufacturer | | | Same Base Formula; Different Manufacturer | | | Paint Component |
|---|---|---|---|---|---|---|---|---|---|---|
| Formula | X | Y | Z | X | Y | Z | X | Y | Z | Risk Score |
| Score Type | PSS | CSS | | | PSS | CSS | | | PSS | CSS | |
| White 1 | 3 | 2 | — | — | 0 | 0 | — | — | 1 | 1 | 7 |
| Red 1 | 0 | 0 | — | — | 2 | 1 | — | — | 1 | 1 | 5 |
| Blue 1 | 3 | 0 | — | — | 2 | 0 | — | — | 0 | 0 | 5 |

Specifically, the paint component risk score for the White 1 paint component in the proposed paint formulation is determined by first identifying previous paint formulations containing the same paint component. In this case, previous paint formulations X and Z also contain White 1. Next, the paint similarities are evaluated between the proposed paint formulation and previous paint formulations X and Z. Previous paint formulation X consists of the same base elements as the proposed paint formulation and are produced by the same manufacturer that produces the proposed paint formulation, thus a paint similarity score of three is assigned. Previous paint formulation Z is produced by a manufacturer other than the manufacturer that produces the proposed paint formulation but comprises the same type of base formulation (solvent-based) as the proposed paint formulation, thus a score of one was also assigned. The compositional similarities are then evaluated so that the compositional similarity scores are assigned with respect to previous paint formulations X and Z. Previous paint formulation X uses the same amount of White 1 as in the proposed paint formulation (and the base elements used in the previous paint formulation are the same as to those used in the proposed paint formulation) thus a score of two is assigned. Previous paint formulation Z also uses the same amount of White 1 as in the proposed paint formulation, thus a score of one is assigned. The assigned paint similarity scores and compositional similarity scores are then added together for a paint component risk score of seven for the paint component White 1.

The paint component risk score for the Red 1 paint component in the proposed paint formulation is determined by first identifying previous paint formulations containing the same paint component. In this case, previous paint formulations Y and Z also contain Red 1. Next, the paint similarities are evaluated between the proposed paint formulation and previous paint formulations Y and Z. Previous paint formulation Y consists of different base elements than the proposed paint formulation but is produced by the same manufacturer that produces the proposed paint formulation, thus a paint similarity score of two is assigned. Previous paint formulation Z is produced by a manufacturer other than the manufacturer that produces the proposed paint formulation but comprises the same type of base formulation (solvent-based) as the proposed paint formulation, thus a score of one is also assigned. The compositional similarities are then evaluated so that the compositional similarity scores can be assigned with respect to previous paint formulations Y and Z. Previous paint formulation Y uses a greater amount of Red 1 than used in the proposed paint formulation, thus a score of one is assigned. Previous paint formulation Z also uses a greater amount of Red 1 than used in the proposed paint formulation, thus a score of one is also assigned. The assigned paint similarity scores and compositional similarity scores are then added together for a paint component risk score of five for the paint component Red 1.

Finally, the paint component risk score for the Blue 1 paint component in the proposed paint formulation is determined by first identifying previous paint formulations containing the same paint component. In this case, previous paint formulations X and Y also contain Blue 1. Next, the paint similarities are evaluated between the proposed paint formulation and previous paint formulations X and Y. Previous paint formulation X consists of the same base elements as the proposed paint formulation and is produced by the same manufacturer that produces the proposed paint formulation, thus a paint similarity score of three is assigned. Previous paint formulation Y consists of different base elements than the proposed paint formulation but is produced by the same manufacturer that produces the proposed paint formulation, thus a paint similarity score of two is also assigned. The compositional similarities are then evaluated so that the compositional similarity scores are assigned with respect to previous paint formulations X and Y. Previous paint formulation X uses a less amount of Blue 1 than used in the proposed paint formulation, thus a score of zero is assigned. Previous paint formulation Y also uses a less amount of Blue 1 than used in the proposed paint formulation, thus a score of zero is also assigned. The assigned paint similarity scores and compositional similarity scores are then added together for a paint component risk score of five for the paint component Blue 1.

Since the manufacturing threshold level for this example is set at five, each individual paint component in the proposed paint formulation satisfies the manufacturing threshold level allowing for the proposed paint formulation to advance towards a manufacturing application (such as undergoing routine testing or being directly used in a manufacturing application). For example, the proposed paint formulation can now be used in an assembly line and applied to the exterior of one or more automobiles. However, if the manufacturing threshold level were set at six (such that the paint component risk scores for the Red 1 and Blue 1 paint components would not satisfy the manufacturing threshold), the proposed paint formulation could undergo further evaluation and/or adjustment. For example, the proposed paint formulation could be adjusted (such as, by eliminating Red 1 and reducing Blue 1 to 5 PWC) such that the paint component risk score for each paint component in the adjusted proposed paint formulation would satisfy the manufacturing threshold value. Specifically, the amount of Blue 1 could be adjusted from 10 PWC to 5 PWC. This would allow the Blue 1 to be assigned three additional points (two points because previous paint formulation X used a greater amount of Blue 1 than used in the proposed paint formulation and one point because previous paint formulation Y used a greater amount of Blue 1 than used in the proposed paint formulation) such that its paint component risk score satisfies the manufacturing threshold value. In addition, Red 1 could be eliminated altogether such that all paint components in the proposed paint formulation would possess a paint component risk score that satisfies the manufacturing threshold value.

Figure 3:
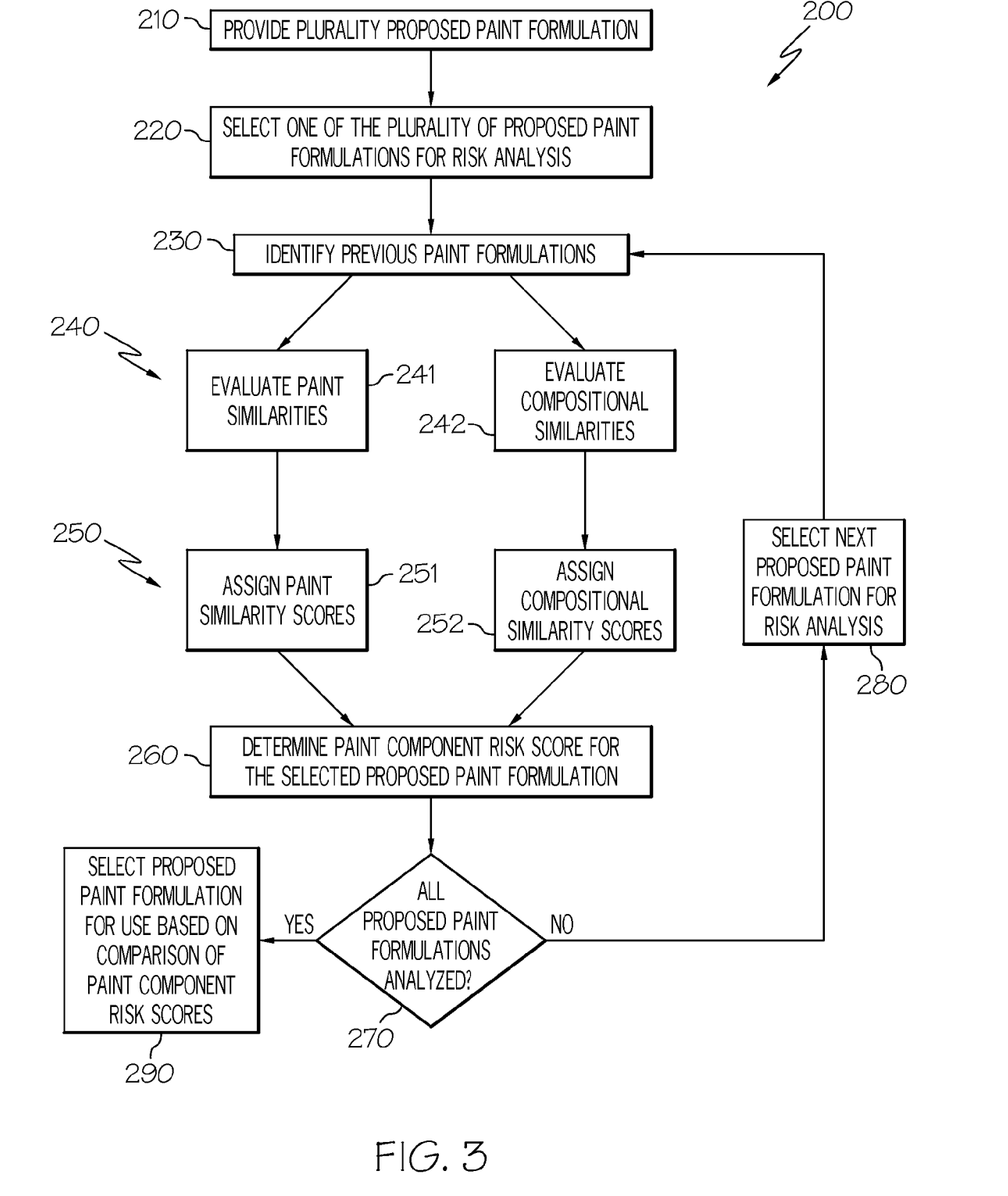
FIG. 3 depicts a method for selecting a proposed paint formulation from a plurality of proposed paint formulations based on paint component risk scores according to one or more embodiments shown and described herein.

Referring now to FIG. 3, the risk assessment method discussed above may be utilized to select a proposed paint formulation for manufacturing from a plurality of proposed paint formulations as illustrated in the proposed paint formulation selection method 200. The proposed paint formulation selection method 200 comprises providing a plurality of proposed paint formulations in step 210. The plurality of proposed paint formulations may comprise a variety of proposed paint formulations that correspond to a target color, as described above. Alternatively, the plurality of proposed paint formulations may comprise various colors such that the success of the proposed paint formulations determines which colors are used in manufacturing. Once the plurality of proposed paint formulations are provided in step 210, one of the proposed paint formulations is selected for risk analysis in step 220. Then, for the selected proposed paint formulation, an evaluation is performed similar to the risk assessment method 100 illustrated in FIGS. 1 and 2.

Specifically, with reference to FIG. 3, previous paint formulations are determined in step 230 that comprise a paint component utilized in the selected proposed paint formulation. Then, each previous paint formulation is evaluated for formulation similarities in step 240 (such as by evaluating paint similarities in step 241 and/or evaluating compositional similarities in step 242). Such evaluations allow for the assignment of formulation similarity scores in step 250 (such as by assigning paint similarity scores in step 251 and/or assigning compositional similarity scores in step 252). The formulation similarity scores assigned in step 250 are thereby utilized in determining the paint component risk score in step 260 for the selected proposed paint formulation. The method may be repeated for the selected proposed paint formulation such that any number of paint components may be evaluated for each individual proposed paint formulation. Once all the desired paint component risk scores are determined for the selected proposed paint formulation, it is determined in step 270 whether all proposed paint formulations have been analyzed. If there are remaining proposed paint formulations yet to be analyzed, then the next proposed paint formulation for risk analysis is selected in step 280 and the method repeats for the newly selected proposed paint formulation starting at step 230. If it is determined in step 270 that all proposed paint formulations have been analyzed, then the paint component risk scores for each of the proposed paint formulations may be utilized to select a specific proposed paint formulation for further use. Further use may comprise use in manufacturing or further evaluation. For example, where higher formulation similarity scores are awarded for more similar previous paint formulations, and the paint component risk scores are determined by adding the formulation similarity scores, the proposed paint formulation with the highest combined paint component risk scores may be the one selected in step 280. In another embodiment, each of the proposed paint formulations may have all of its paint component risk scores averaged, such that the proposed paint formulation with the highest average paint component risk score is selected for manufacturing in step 280. In the alternative, each of the proposed paint formulations which possess an average paint component risk score that satisfies a manufacturing threshold value may be selected in step 280. In addition, any other hierarchy or scoring relationship may be utilized in determining formulation similarity scores in step 250, determining paint component risk scores in step 260, and/or the selection of a proposed paint formulation from the plurality of proposed paint formulations in step 280.

It should now be appreciated that the method described herein may be used to evaluate the performance risk of one or more paint components in proposed paint formulations. A given paint component in the proposed paint formulation may be selected and previous paint formulations comprising that same paint component may be identified. Then, comparing formulation similarities (such as paint similarities and compositional similarities) between the proposed paint formulation and the previous paint formulations may be used to determine formulation similarity scores (such as paint similarity scores and compositional similarity scores) of the paint component. The formulation similarity scores may then be used to determine an overall paint component risk score for the selected paint component. The paint component risk score is then compared with a manufacturing threshold value to determine the utilization of the paint component and/or the proposed paint formulation. A combination of paint components and/or proposed paint formulations may thereby be evaluated to determine the risk of use in manufacturing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for predicting performance risk of paint components, the method comprising:
   providing a proposed paint formulation, wherein the proposed paint formulation comprises at least one paint component;
   identifying a previous paint formulation having the paint component;
   evaluating formulation similarities between the previous paint formulation and the proposed paint formulation;
   assigning a formulation similarity score based on the formulation similarities;
   transforming, automatically with a computer, the formulation similarity score into a paint component risk score for the paint component; and
   utilizing the proposed paint formulation in a manufacturing application when the paint component risk score satisfies a manufacturing threshold value.

2. The method of claim 1 wherein the paint component is adjusted when the component risk score does not satisfy the manufacturing threshold value.

3. The method of claim 2 wherein adjusting the paint component comprises changing an amount of the paint component in the proposed paint formulation.

4. The method of claim 1 wherein a plurality of previous paint formulations having the paint component are identified; and
   a plurality of formulation similarity scores are assigned based on formulation similarities between the proposed paint formulation and each of the plurality of previous paint formulations.

5. The method of claim 1 wherein the formulation similarities are paint similarities.

6. The method of claim 5 wherein the paint similarities comprise similarities between resins, solvents, additives, or combinations thereof, in the proposed paint formulation and the previous paint formulations.

7. The method of claim 1 wherein the formulation similarities are compositional similarities.

8. The method of claim 7 wherein the compositional similarities comprise similarities between an amount of the paint component in the proposed paint formulation and the amount of the paint component in the previous paint formulation.

9. The method of claim 1 wherein the formulation similarities are compositional similarities and paint similarities.

10. The method of claim 1 wherein the paint component is selected from a list consisting of pigments, metallic flakes or combinations thereof.

11. The method of claim 1 wherein the paint component risk score satisfies the manufacturing threshold value when the paint component risk score is greater than or equal to the manufacturing threshold value.

12. The method of claim 1 wherein:
   the proposed paint formulation comprises a plurality of paint components; and
   a paint component risk score is determined for each of the plurality of paint components in the proposed paint formulation; and
   the proposed paint formulation is utilized in manufacturing if each of the paint component risk scores satisfies the manufacturing threshold value.

13. A method for adjusting a paint formulation, the method comprising:
   providing a proposed paint formulation, the proposed paint formulation comprising at least one paint component;
   identifying previous paint formulations comprising the paint component;
   evaluating paint similarities between the previous paint formulations and the proposed paint formulations;
   assigning paint similarity scores based on the paint similarities;
   evaluating compositional similarities between the amount of the paint component in the proposed paint formulation and the amount of the paint component in the previous paint formulations;
   assigning compositional similarity scores based on the compositional similarities;
   transforming, automatically with a computer, the paint similarity scores and the compositional similarity scores into a paint component risk score for the paint component; and
   adjusting the paint component in the proposed paint formulation when the paint component risk score does not satisfy a manufacturing threshold value.

14. The method of claim 13 wherein the paint similarity scores comprise one of a low paint similarity score, an intermediate paint similarity score greater than the low paint similarity score, and a high paint similarity score greater than the intermediate similarity score.

15. The method of claim 14 wherein:
   the low paint similarity score is assigned when the proposed paint formulation and the previous paint formulation comprise a different base formulation and are produced by different manufacturers;
   the intermediate paint similarity score is assigned when the proposed paint formulation and the previous paint formulation comprise a different base formulation and are produced by a common manufacturer; and
   the high paint similarity score is assigned when the proposed paint formulation and the previous paint formulation comprise the same base formulation and are produced by the common manufacturer.

16. The method of claim 13 wherein the compositional similarity scores comprise one of a low compositional similarity score and a high compositional similarity score greater than the low compositional similarity score.

17. The method of claim 16 wherein:
   the low compositional similarity score is assigned when an amount of paint component in the proposed paint formulation is greater than an amount of paint component in the previous paint formulation; and
   the high compositional similarity score is assigned when the amount of paint component in the proposed paint formulation is less than or equal to the amount of paint component in the previous paint formula.

18. A method for selecting a proposed paint formulation, the method comprising:
   providing a plurality of proposed paint formulations;
   determining paint component risk scores for each of the plurality of proposed paint formulations by:
      identifying previous paint formulations comprising a paint component of the proposed paint formulation;
      evaluating paint similarities between the previous paint formulations and the proposed paint formulation;

assigning paint similarity scores for each of the proposed paint formulations based on the paint similarities;

evaluating compositional similarities between the amount of the paint component in the proposed paint formulation and the amount of the paint component in the previous paint formulations;

assigning paint compositional similarity scores based on the compositional similarities between the proposed paint formulation and the previous paint formulations;

transforming, automatically with a computer, the paint similarity scores and compositional similarity scores into the paint component risk score for the paint component; and using a favored proposed paint formulation in manufacturing, wherein the favored proposed paint formulation is selected from the plurality of proposed paint formulations based on its paint component risk score.

19. The method of claim 18 wherein the favored proposed paint formulation is the proposed paint formulation with a highest combined paint component risk score amongst all of the plurality of proposed paint formulations.

20. The method of claim 18 wherein the favored proposed paint formulation is the proposed paint formulation with a highest average paint component risk score amongst all of the plurality of proposed paint formulations.

\* \* \* \* \*